(12) United States Patent
Shiga et al.

(10) Patent No.: US 9,395,741 B2
(45) Date of Patent: Jul. 19, 2016

(54) ELECTRIC-POWER MANAGEMENT SYSTEM, ELECTRIC-POWER MANAGEMENT METHOD, AND SECTION CONTROLLER

(75) Inventors: Yasuko Shiga, Yokohama (JP); Tohru Watanabe, Zushi (JP); Shigeki Hirasawa, Machida (JP); Isao Wachi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 876 days.

(21) Appl. No.: 13/640,642

(22) PCT Filed: Mar. 16, 2011

(86) PCT No.: PCT/JP2011/001522
§ 371 (c)(1),
(2), (4) Date: Dec. 26, 2012

(87) PCT Pub. No.: WO2011/129054
PCT Pub. Date: Oct. 20, 2011

(65) Prior Publication Data
US 2013/0110304 A1 May 2, 2013

(30) Foreign Application Priority Data

Apr. 12, 2010 (JP) .................................. 2010-091055

(51) Int. Cl.
*B60L 3/04* (2006.01)
*B60L 11/18* (2006.01)
(Continued)

(52) U.S. Cl.
CPC ... *G05F 5/00* (2013.01); *B60L 3/04* (2013.01); *B60L 11/1842* (2013.01);
(Continued)

(58) Field of Classification Search
CPC ... B60L 3/04; B60L 11/1842; B60L 11/1844; B60L 2210/10; B60L 2230/20; B60L 2230/30; B60L 2230/40; B60L 2240/547; B60L 2240/80; B60L 2260/54; G05F 5/00; H02J 3/14; H02J 13/0079; Y02B 70/3225; Y02E 60/721; Y02T 10/7005; Y02T 10/7088; Y02T 10/7216; Y02T 90/121; Y02T 90/127; Y02T 90/128; Y02T 90/14; Y02T 90/163; Y02T 90/168; Y04S 10/126; Y04S 20/222; Y04S 30/12

USPC ..................................... 700/286, 291, 295, 297
See application file for complete search history.

(56) References Cited

U.S. PATENT DOCUMENTS

| 7,069,117 B2 * | 6/2006 | Wilson ..................... H02J 3/14 327/101 |
| 7,184,861 B2 * | 2/2007 | Petite ....................... H02J 3/14 340/870.01 |

(Continued)

FOREIGN PATENT DOCUMENTS

| CA | WO 2012167383 A1 * | 12/2012 | ............... F24H 7/00 |
| CN | WO 2012119300 A1 * | 9/2012 | ............... H02J 3/13 |

(Continued)

OTHER PUBLICATIONS

PCT International Search Report on application PCT/JP2011/001522 mailed Jun. 14, 2011; 1 page.

(Continued)

*Primary Examiner* — Robert Fennema
*Assistant Examiner* — Jennifer L Norton
(74) *Attorney, Agent, or Firm* — Foley & Lardner LLP

(57) ABSTRACT

Electric-power management system, an area controller transmits, to each of section controllers, information about a target voltage and information about the present voltage, each of the section controllers calculating a difference between the target voltage and the present voltage, received from the area controller, and calculating a power's demand-supply-adjustment request amount based on difference between the information about the voltages, each of facility-equipment controllers transmitting power-reception/power-release capable equipment information to each section controller, being information about a power-reception/power-release capable equipment in a facility into which the facility-equipment controller is installed, the section controller, based on the power-reception/power-release capable equipment information about the equipment, transmitting the equipment's demand-supply-adjustment request amount and the facility-equipment controller transmitting a control signal to the equipment based on the equipment's demand-supply-adjustment request amount received from the section controller to the facility-equipment controller in the facility.

17 Claims, 12 Drawing Sheets

(51) Int. Cl.
  *G05F 5/00* (2006.01)
  *H02J 3/14* (2006.01)
  *H02J 13/00* (2006.01)

(52) U.S. Cl.
  CPC .............. *B60L 11/1844* (2013.01); *H02J 3/14* (2013.01); *H02J 13/0079* (2013.01); *B60L 2210/10* (2013.01); *B60L 2230/20* (2013.01); *B60L 2230/30* (2013.01); *B60L 2230/40* (2013.01); *B60L 2240/547* (2013.01); *B60L 2240/80* (2013.01); *B60L 2260/54* (2013.01); *Y02B 70/3225* (2013.01); *Y02E 60/721* (2013.01); *Y02T 10/7005* (2013.01); *Y02T 10/7088* (2013.01); *Y02T 10/7216* (2013.01); *Y02T 90/121* (2013.01); *Y02T 90/127* (2013.01); *Y02T 90/128* (2013.01); *Y02T 90/14* (2013.01); *Y02T 90/163* (2013.01); *Y02T 90/168* (2013.01); *Y04S 10/126* (2013.01); *Y04S 20/222* (2013.01); *Y04S 30/12* (2013.01)

(56) References Cited

U.S. PATENT DOCUMENTS

| | | | | |
|---|---|---|---|---|
| 7,218,998 B1* | 5/2007 | Neale | ................. | H02J 3/14 700/295 |
| 7,262,694 B2* | 8/2007 | Olsen | ................. | H04M 9/08 340/531 |
| 8,103,386 B2* | 1/2012 | Ichikawa | ............ | B60L 11/1811 700/286 |
| 8,374,729 B2* | 2/2013 | Chapel | ................ | H02J 13/0082 307/29 |
| 8,872,379 B2* | 10/2014 | Ruiz | ................... | B60L 11/1816 307/66 |
| 9,014,864 B2* | 4/2015 | Najewicz | ............... | G05B 15/02 700/291 |
| 9,054,532 B2* | 6/2015 | Sortomme | ................ | H02J 7/00 |
| 9,071,082 B2* | 6/2015 | Nishibayashi | ............ | H02J 3/32 |
| 9,088,179 B2* | 7/2015 | Shaffer | ................ | H02J 3/14 |
| 9,099,868 B2* | 8/2015 | Taft | ............ | H02J 3/00 |
| 9,246,332 B2* | 1/2016 | Broniak | .................... | H02J 3/14 |
| 2006/0125422 A1 | 6/2006 | Costa | | |
| 2008/0077368 A1 | 3/2008 | Nasle | | |
| 2009/0228324 A1 | 9/2009 | Ambrosio et al. | | |
| 2012/0330473 A1* | 12/2012 | Meredith | .................. | H02J 3/14 700/291 |
| 2013/0261823 A1* | 10/2013 | Krok | ......................... | G05F 5/00 700/291 |
| 2013/0289790 A1* | 10/2013 | Park | ......................... | G06F 1/26 700/295 |
| 2014/0084682 A1* | 3/2014 | Covic | ...................... | H02J 3/14 307/17 |
| 2014/0324193 A1* | 10/2014 | Kitaji | ...................... | H02J 3/14 700/22 |
| 2015/0241895 A1* | 8/2015 | Lu | ........................... | G05B 15/02 700/295 |
| 2015/0263525 A1* | 9/2015 | Fornage | .................... | H02J 3/14 307/35 |

FOREIGN PATENT DOCUMENTS

| | | |
|---|---|---|
| JP | 2002-044870 | 2/2002 |
| JP | 2006-121853 A | 5/2006 |
| JP | 2007-267600 A | 10/2007 |
| JP | 2007-288877 A | 11/2007 |
| JP | 2008-125295 A | 5/2008 |
| WO | WO 2008/113052 A1 | 9/2008 |
| WO | WO 2009/016038 A2 | 2/2009 |

OTHER PUBLICATIONS

European Patent Office extended search report on application 11768581.8 dated Oct. 29, 2015; 8 pages.

* cited by examiner

DETERMINATION GRAPH FOR POWER AMOUNT OF DEMAND-SUPPLY-ADJUSTMENT REQUEST

ELECTRIC-POWER MANAGEMENT SYSTEM, ELECTRIC-POWER MANAGEMENT METHOD, AND SECTION CONTROLLER

TECHNICAL FIELD

The present invention relates to an electric-power management system, an electric-power management method, and a section controller.

BACKGROUND ART

At present, a variety of technological commitments are underway in order to implement the introduction of new energies, such as photovoltaic power generation and wind power generation. As one of such commitments, there is a type of technology for making a contribution to stabilization of the power distribution system.

For example, in the technology disclosed in PATENT LITERATURE 1, the following commitment is described: Namely, control is executed over the power demand-supply for the power distribution system to which a distributed power-source system is connected. Here, this distributed power-source system uses batteries and photovoltaic power generators which are installed into facilities.

CITATION LIST

Patent Literature

PATENT LITERATURE 1: JP-A-2002-44870

SUMMARY OF INVENTION

Technical Problem

In PATENT LITERATURE 1 the batteries and photovoltaic power generators installed in the facilities are selected as the control targets. Of power generators which will be actually used from now on, however, there is the following type of power generator (such as the photovoltaic power generator): Namely, it is desirable not to suppress its output whenever possible in order to implement the effective utilization of the photovoltaic resource. Also, the batteries are apt to be damaged by exhaustion, and are unlikely to come into common use in average households since they are expensive. As a result, there exists a certain limit, if the control over the power demand-supply for the power distribution system is executed using only the batteries which have already come into practical use. On account of this limit, there is a possibility that it becomes impossible to sufficiently execute the power demand-supply control over the power distribution system. This possibility brings about a danger that the voltage in the power distribution system will exceed the range of a certain reference value. Accordingly, in the technology disclosed in PATENT LITERATURE 1, it is impossible to stabilize the power distribution system's voltage into the constant range, i.e., an object from the beginning. Here, this stabilization is required to be implemented by effectively utilizing the photovoltaic resource, and without imposing an excessive load onto the equipment such as the batteries.

In view of this situation, there is provided a technology for stabilizing the power distribution system's voltage into a certain constant range.

Solution to Problem

In order to solve the above-described problem, an aspect of the present invention is constituted with the following configuration: Namely, an electric-power management system wherein an area controller transmits, to each of section controllers, information about a target voltage and information about the present voltage, each of the section controllers calculating a difference between the information about the target voltage and the information about the present voltage, which the section controller has received from the area controller, and calculating a power's demand-supply-adjustment request amount based on the difference between the information about the voltages, each of facility-equipment controllers transmitting power-reception/power-release capable equipment information to each section controller, the power-reception/power-release capable equipment information being information about a power-reception/power-release capable equipment in a facility into which the facility-equipment controller is installed, the section controller, based on the power-reception/power-release capable equipment information about the equipment, transmitting the equipment's demand-supply-adjustment request amount and the facility-equipment controller transmitting a control signal to the equipment based on the equipment's demand-supply-adjustment request amount that the facility-equipment controller has received from the section controller the facility-equipment controller in the facility into which the equipment is installed.

Advantageous Effects of Invention

It becomes possible to stabilize the power distribution system's voltage within a certain constant range.

DESCRIPTION OF EMBODIMENTS

Embodiment 1

Figure 1:
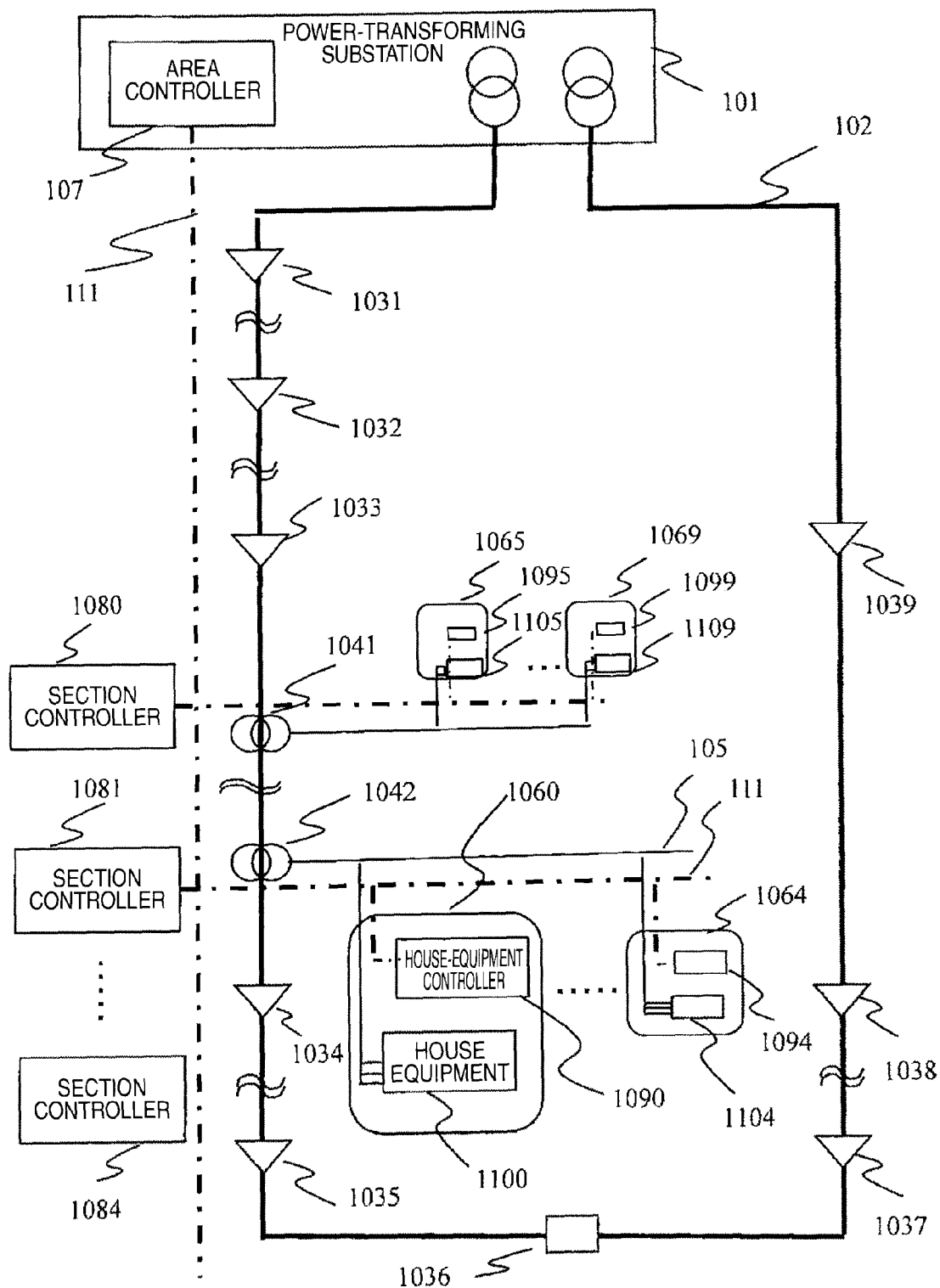
FIG. 1 This is a diagram for illustrating a configuration example of an electric-power management system and an electric-power system associated with the service management.

Hereinafter, using and referring to the drawings, the explanation will be given below concerning the present embodiment of the present invention.

FIG. 1 is a configuration diagram of an electric-power management system according to the present embodiment, and an electric-power system associated with the service management.

The electric-power-distributing-service management system includes an area controller 107, section controllers 1080~1084, and house-equipment controllers 1090~1099 (A facility refers to a place at which the use of power or power generation is performed, such as common house, factory, plant, or building. A facility-equipment controller, which is installed into a house, is referred to as "house-equipment controller"). These controllers mutually coordinate with each other, thereby controlling the electric power and the equipment constituting the electric-power system.

A power transforming substation 101 extracts a high-voltage power-distributing line 102, thereby performing the supply of the power. The high-voltage power-distributing line 102 is a power-distributing line for demanding/supplying the power from the power-transforming substation 101. Also, openers/closers 1031~1039 perform the electrical connection or disconnection of the high-voltage power-distributing line 102. Also, on-pillar transformers 1041 and 1042 are installed onto the power-distributing line that is sandwiched among the openers/closers 1031~1039. The on-pillar transformers 1041 and 1042 extract a low-voltage power-distributing line 105, thereby performing the power supply destined to, e.g., the houses 1060~1069. The low-voltage power-distributing line 105 is a power-distributing line for connecting the on-pillar transformers 1041 and 1042 to the respective houses 1060~1069. The plural units of house equipment 1100~1109 are installed into the houses 1060~1069, respectively. Here, the house equipment may also be of facilities other than the houses, such as, e.g., common household, building, and plant.

The house-equipment controllers 1090~1099, which are respectively installed into the houses 1060~1069, manage the power supply associated with the houses, and information about the house equipment 1100~1109. The plural units of house equipment 1100~1109 refer to equipments which are to be installed into the houses. Moreover, the section controllers 1080~1084 are set up in the unit of a switch, or for each of the on-pillar transformers. Here, "the section" refers to a plurality of houses which exist in the downstream from a switch, or an on-pillar transformer. The section controllers 1080~1084 manage information about the low-voltage power-distributing line and the equipment existing inside the section. The area controller 107, which is installed into the power-transforming substation 101, manages information about the high-voltage power-distributing line extracted from the power-transforming substation 101, and the equipment associated therewith. This group of these controllers transmits/receives these pieces of information via a communications network 111.

Figure 10:
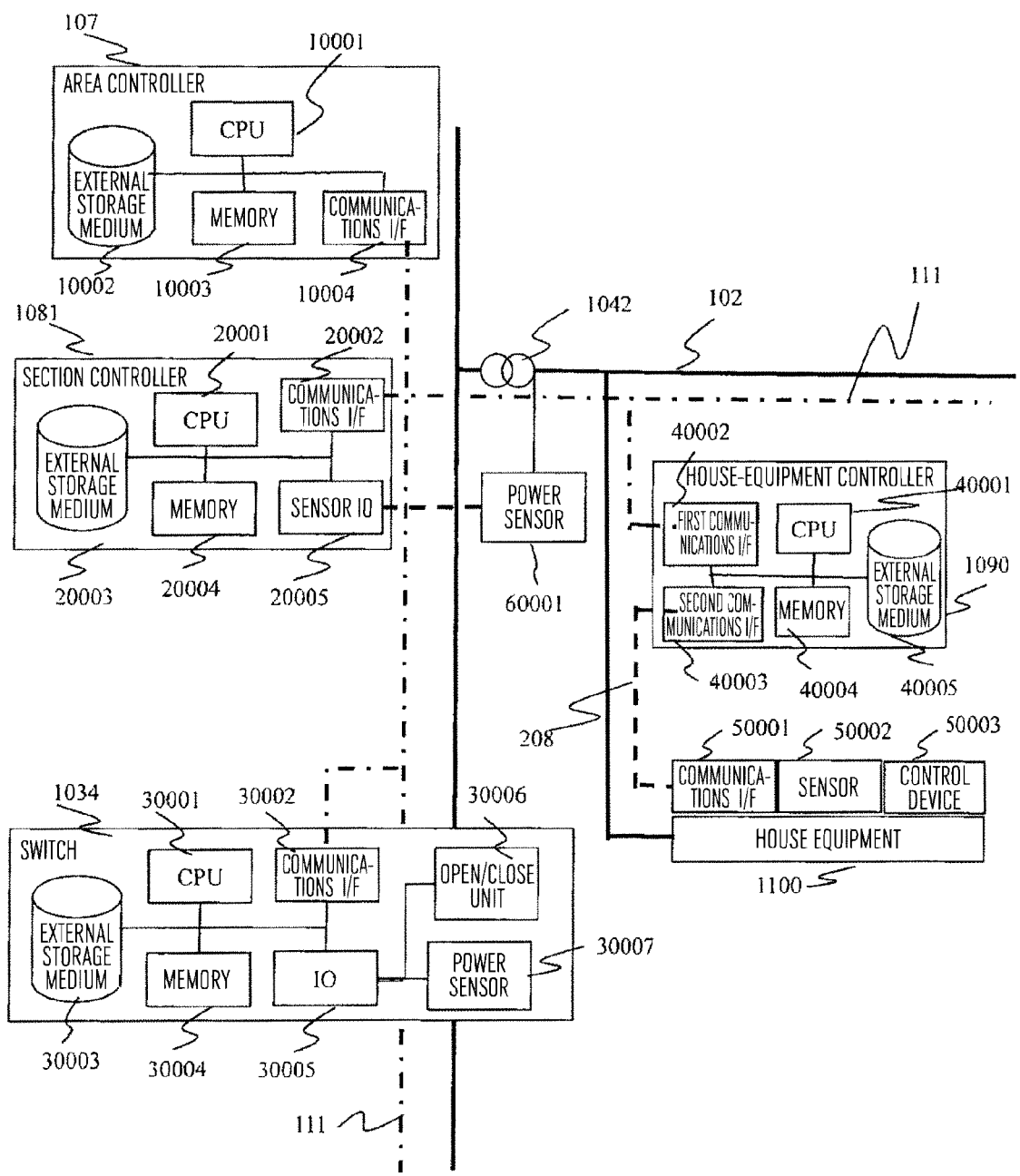
FIG. 10 This is a diagram for illustrating an example of the hardware configuration of the electric-power management system.

FIG. 10 illustrates an exam pie of the hardware configuration of the electric-power management system illustrated in FIG. 1. The electric-power management system includes the area controller 107, the section controller 1081, and the house-equipment controller 1090. These controllers are connected to each other via the communications line 111.

The area controller 107 is constituted by including a CPU 10001, an external storage medium 10002, a memory 10003, and a communications interface 10004. Of the above-described configuration components of the area controller 107, the CPU 10001 reads and executes programs stored in the memory 10003, thereby implementing respective types of functions of the area controller 107. The external storage medium 10002 stores therein information (e.g., the resistance value and reactance value of the section) needed for implementing the functions of the area controller 107, such as data on the equipment existing in the downstream from the power-transforming substation 101. The communications interface 10004 performs communications with the section controller 1081 and the house-equipment controller 1090 via the communications line 111.

The section controller 1081 is constituted by including a CPU 20001, a communications interface 20002, an external storage medium 20003, a memory 20004, and a sensor IO 20005. Of the above-described configuration components of the section controller 1081, the CPU 20001 reads and executes programs stored in the memory 20004, thereby implementing respective types of functions of the section controller 1081. Also, the sensor IO 20005 performs the reception of measurement values (e.g., the voltage and current) obtained by a power sensor 60001 which is fixed on the on-pillar transformer 1042. The CPU 20001 stores these measurement values into the memory 20004 for a necessary time-period. The external storage medium 20003 stores therein information needed for implementing the functions of the section controller 1081, such as data on the houses existing in the downstream from the on-pillar transformer 1042. The communications interface 20002 performs communications with the area controller 107 and the house-equipment controller 1090 via the communications line 111.

The house-equipment controller 1090 is constituted by including a CPU 40001, a first communications interface 40002, a second communications interface 40003, a memory 40004, and an external storage medium 40005. Of the above-described configuration components of the house-equipment controller 1090, the CPU 40001 reads and executes programs stored in the memory 40004, thereby implementing respective types of functions of the house-equipment controller 1090. The external storage medium 40005 stores therein information needed for implementing the functions of the house-equipment controller 1090, such as house-equipment data. The first communications interface 40002 performs communications with the section controller 1081 via the communications line 111. The second communications interface 40003 performs communications with the house equipment 1100 via the communications line 111.

The power is supplied to the house equipment 1100 is the low-voltage power-distributing line 105. The house equipment 1100 includes a communications interface 50001, a sensor 50002, and a control device 50003. Of the above-described components, the sensor 50002 acquires measurement values (e.g., the remaining amount of a battery and the power-generation amount of a photovoltaic power generator) for indicating the state of the house equipment. The control device 50003 performs the control over the house equipment 1100. The communications interface 50001 transmits the measurement values to the house-equipment controller 1090, or receives a control signal from the house-equipment controller 1090 via a communications line 208.

The switch 1034 is constituted by including a CPU 30001, a communications interface 30002 an external storage medium 30003, a memory 30004, an IO 30005, an open/close unit 30006, and a power sensor 30007. Of the above-described components, the power sensor 30007 acquires measurement values (e.g., the voltage and current) for indicating the state of the section. The acquired values are received by the IO 30005, then being stored into the memory 30004 for a necessary time-period by the CPU 30001. The external storage medium 30003 stores therein information needed for operating the open/close unit 30006. The CPU 30001 reads and executes programs stored in the memory 30004, thereby operating the open/close unit 30006. The operation of the open/close unit 30006 may also be performed by another controller via the communications interface 30002 and the communications line 111.

Here, the configuration of the section controller 1081 is the same as that of the section controllers 1080~1084. Also the configuration of the house-equipment controller 1090 is the same as that of the house-equipment controllers 1090~1099.

Figure 2:
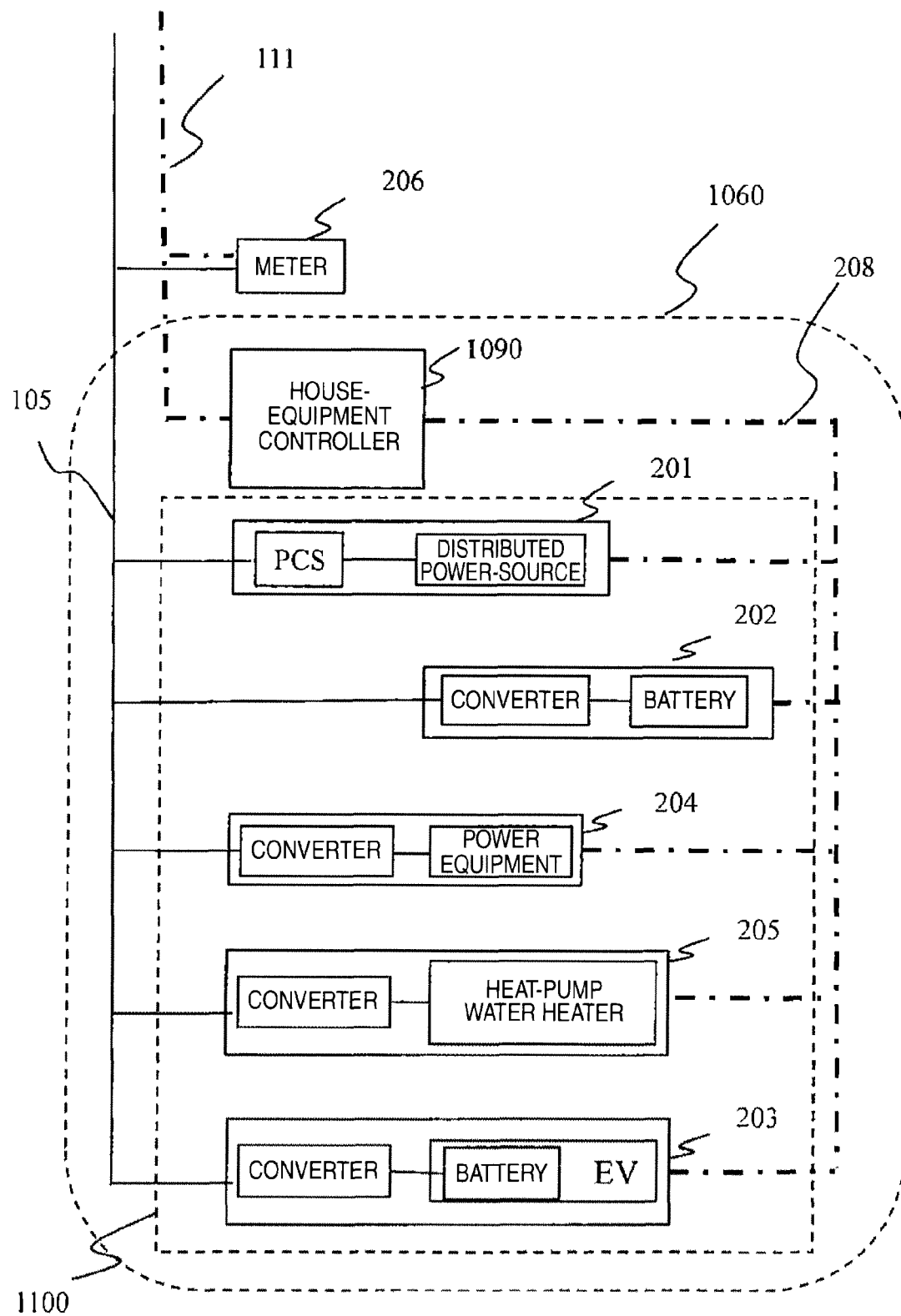
FIG. 2 This is a diagram for illustrating a configuration example of the system inside a house.

Of the electric-power management system illustrated in FIG. 1, FIG. 2 is a diagram for starting a detailed configuration example of the inside of the house 1060.

The house equipment 1100 refers to plural units of equipment which are to be installed into the house 1060. Hereinafter, concrete examples of the house equipment will be specified: Namely, these examples are a distributed power-source device 201 for performing power generation, a battery device 202 for performing charge/discharge, an electric vehicle EV) 203, a power-equipment device 204 for performing power consumption, and a heat-pump water heater 205. The power is supplied to these units of house equipment from the low-voltage power-distributing line led into the house 1060. The distributed power-source device 201 is equipped with a PCS (Power Conditioning Subsystem). Incidentally, although not illustrated, each of the battery 202, the power equipment 204, the heat-pump water heater 205, and the EV 203 may also be equipped with the PCS as a converter. The PCS is constituted from an inverter, the converter, and a control device. The control device makes the input/output power adjustment by controlling the inverter and the converter, or performs stop of the inverter and the converter in order to prevent the single operation from occurring at the time of a system accident. A meter 206 collects, integrates, and manages information from the meter set up in each unit of the equipment 201~205, such as information about the house's power-supply amount, power-consumption amount, and power-generation amount. In order to implement a group-mannered collective operation of the plural units of equipment, the house-equipment controller 1090 performs the control over each unit of the equipment on the basis of the information from the meter 206 via the communications line 208.

Figure 3:
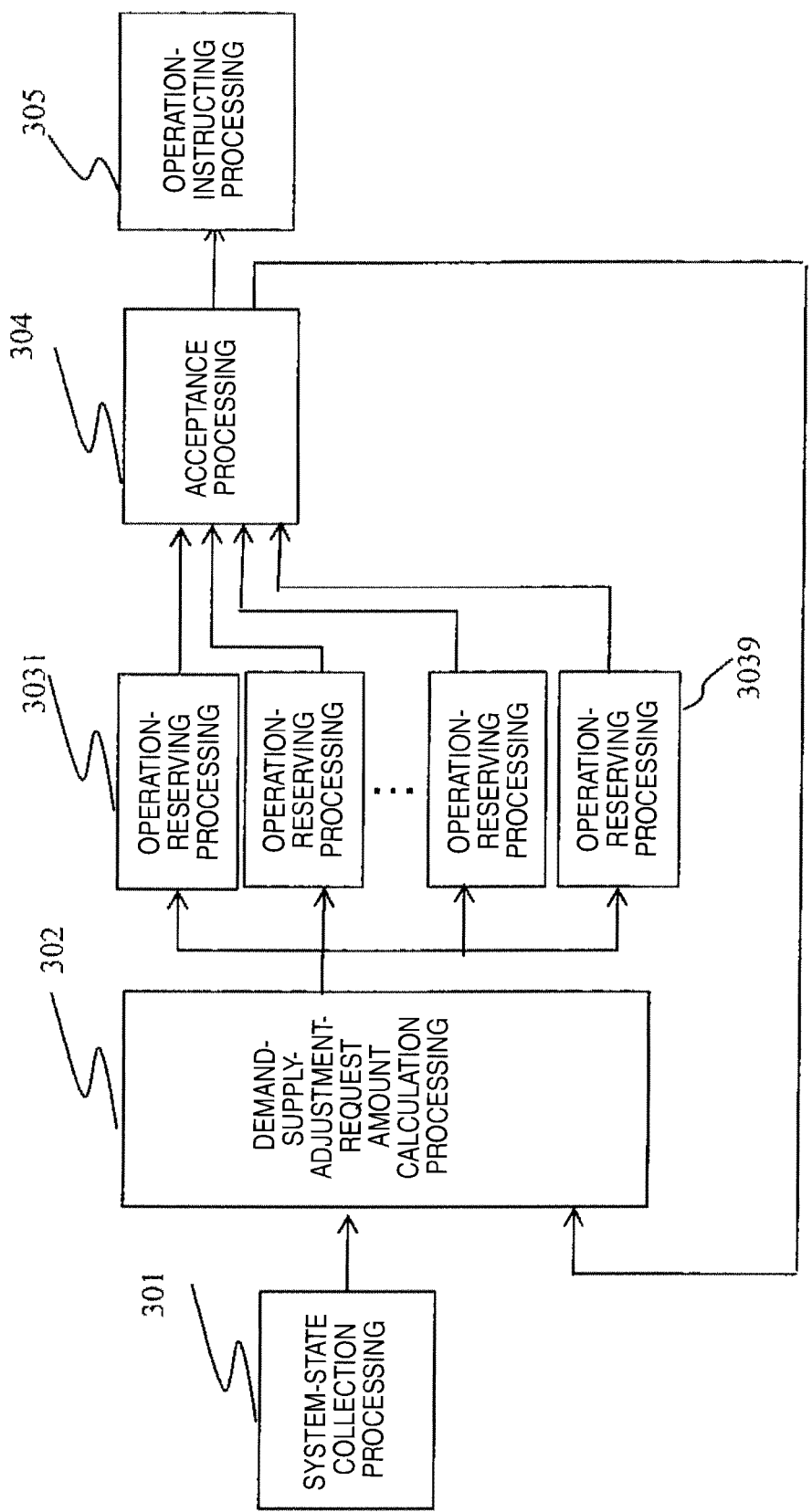
FIG. 3 This is a processing block diagram for illustrating an example of the processings executed in the electric-power management system.

FIG. 3 is a processing block diagram for illustrating processings executed in the electric-power management system illustrated in FIG. 1. Referring to FIG. 3, the explanation will be given below concerning the processings executed by the controller group (: 107, 1080~1084, 1090~1099).

A system-state collection processing 301 is a processing executed by the area controller 107. The area controller 107 acquires the measurement values (e.g., the voltage and current) from the communications with each of the section controllers 1080~1084. Here, the measurement values are obtained by the power sensor 60001 fixed on the on-pillar transformer 1042 and are then acquired by each of the section controllers 1080~1084. Otherwise, the area controller 107 attaches sensors onto the meter 206 and the openers/closers 1031~1039, thereby measuring a section-flow-in current and a section-flow-out current in each section. In this the area controller 107 estimates or calculates the voltage in each section. Also, the area controller 107 sets information about a target voltage. For example, the area controller 107 may determine the target-voltage value at 101 V, or may set the target-voltage value at a range of (101±6) V. The area controller 107 acquires the section-flow-in current, section-flow-out current, section's resistance value, and section's reactance value, thereby estimating or calculating the voltage in each section. In this way, the area controller 107 transmits, to each of section controllers, information about the target voltage and information about the present voltage.

A demand-supply-adjustment-request amount calculation processing 302 is a processing executed by a demand-supply-adjustment-request amount calculation unit of each of the section controllers 1080~1084. In this processing, based on the voltage in each section obtained from the system-state collection processing 301, a demand-supply-adjustment request amount is calculated which is necessary for allowing the voltage to come closer to the predetermined target-voltage value (e.g., 101 V). Here, the request amount may also be calculated based on a value other than the voltage, e.g., a value about effective power, ineffective power, or frequency-involved power. Each of the section controllers 1080~1084 calculates a difference between the information about the target voltage and the information about the present voltage, which the section controller has received from the area controller. Moreover, the section controller calculates the power's demand-supply-adjustment request amount which is based on the difference between the information about the voltages. Incidentally, if there exists a section controller whose voltage is predicted to become higher or lower than the reference value, the area controller 107 may transmit the target voltage not only to this section controller, but also to another section controller which will exert its influence onto this section controller.

Operation-reserving processings 3031~3039 are processings executed by operation-reserving units of the house-equipment controllers 1090~1099. The operation-reserving processings 3031~3039 are the following processings: Namely, a house-equipment controller in a house is capable of performing power-reception or power-release by operating one of the house equipment 1100~1109 on the basis of the necessary power's request amount calculated in the demand-supply-adjustment-request amount calculation processing 302 this time, in accordance with the operation-reserving processings 3031~3039, this house-equipment controller outputs a power-reception/power-release capable power's amount, and a signal for the reservation of the power-reception/power-release of its power-reception/power-release capable equipment. Here, the power-reception refers to, e.g., the consumption power of an air conditioner or water heater, and the power flowing into the house from the power-distributing line including a battery. The power-release refers to, e.g., the power flowing out of the house to the power-distributing line from the battery, or by the PV power generation. In this way, the house-equipment controller transmits the power-reception/power-release capable information to the section controller, the power-reception/power-release capable information being information about the power-reception/power-release capable equipment in a facility into which the house-equipment controller is installed.

An acceptance processing 304 is a processing executed by an acceptance-processing transmission unit of each of the section controllers 1080~1084. Based on the power-reception/power-release capable power's amount, and the signal for the reservation outputted by the operation-reserving processings 3031~3039 this acceptance processing 304 calculates a combination of the plural units of house equipment, the power's request amounts, and their sum total which are allowed to come closer to the predetermined target-voltage value.

An operation-instructing processing 305 is a processing executed by an operation-instructing unit of each of the house-equipment controllers 1090~1099. Based on the combination of the units of house equipment and the power's request amounts outputted by the acceptance processing 304, the operation-instructing processing 305 outputs signals for operating the corresponding units of house equipment to the corresponding units of house equipment. In this way, the section controller, based on the power-reception/power-release capable information about the equipment, transmits the equipment's demand-supply-adjustment request amount to the facility-equipment controller in the facility into which the equipment is installed. After that, the facility-equipment controller transmits the control signal to the equipment based on the equipment's demand-supply-adjustment request amount that the facility-equipment controller has received from the section controller.

The processings in the present diagram are caused to follow variations in the section-flow-in current and the section-flow-out current. Accordingly, the processings are performed in accordance with a predetermined time width (e.g., every 0.5 hour or 1 hour in a day), or when the power amount supplied from the power-transforming substation change significantly.

Next, the explanation will be given below concerning the demand-supply-adjustment-request amount calculation processing 302, the operation-reserving processings 3031~3039, and the acceptance processing 304, using FIG. 4, FIG. 6, and FIG. 7, respectively.

Figure 4:
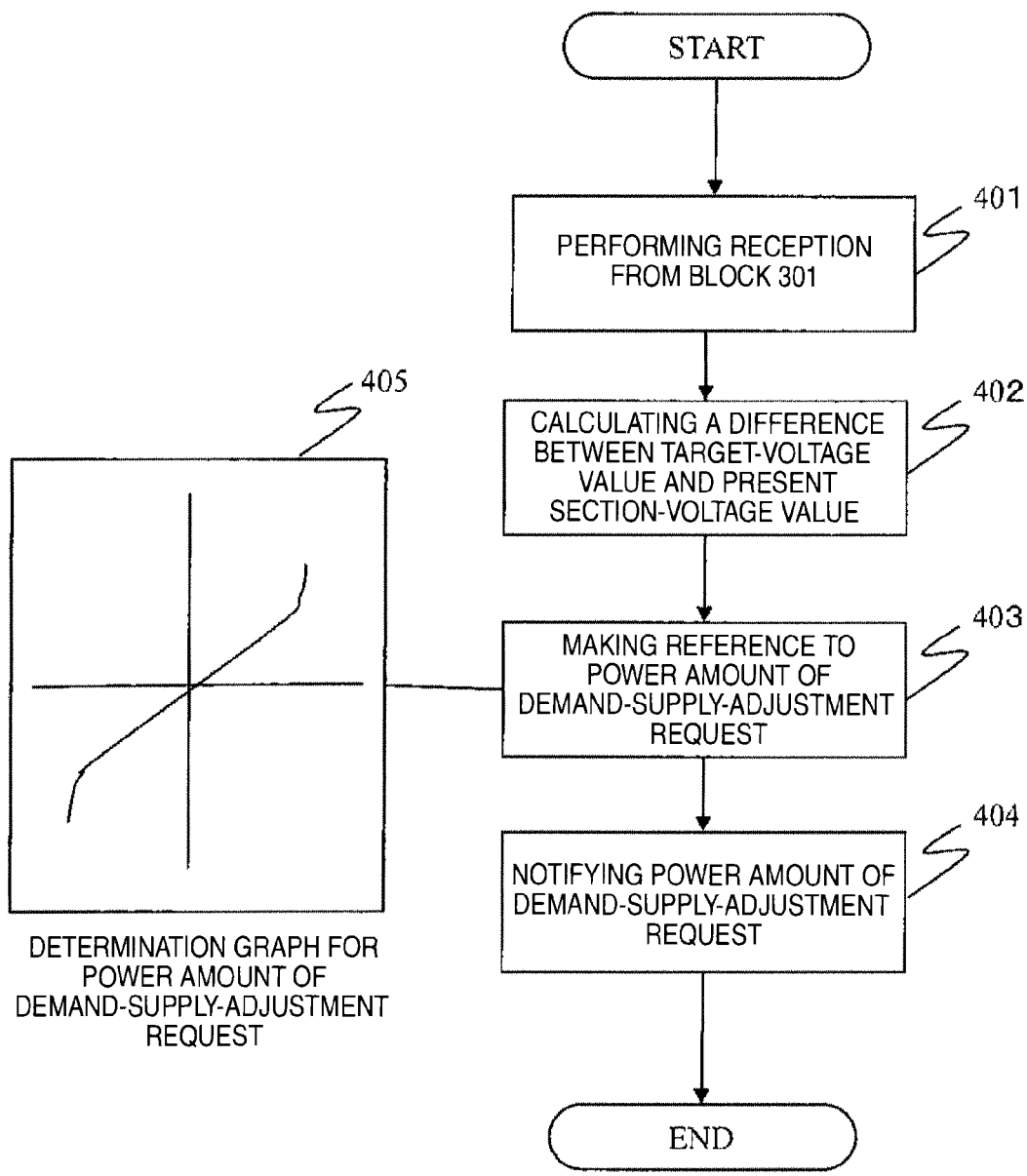
FIG. 4 This is a flowchart for illustrating an example of the demand-supply-adjustment-request amount calculation processing.

FIG. 4 is a flowchart diagram for illustrating an example of the demand-supply-adjustment-request amount calculation processing 302 in the control block diagram illustrated in FIG. 3. Incidentally, this processing is a processing executed by each of the section controllers 1080~1084.

At a step 401, each of the section controllers 1080~1084 receives the voltage value in the present section, which is estimated or calculated by the system-state collection processing 301 in the area controller 107.

At a step 402, the section controller calculates the difference between the present section-voltage value which the section controller has received at the step 401, and the target-voltage value (e.g., 101 V).

At a step 403, the section controller makes reference to a predetermined graph 405, thereby calculating the demand-supply-adjustment request power amount kWh from the difference ΔV between the present section-voltage value and the target-voltage value.

At a step 404, the section controller notifies the house equipment existing inside the section of the demand-supply-adjustment request including the demand-supply-adjustment power amount to be requested. Incidentally, the predetermined graph 405 will be described later in FIG. 5.

In addition to the present embodiment, in order to prevent a stationary deviation from occurring, the following controls may be performed with respect to the difference ΔV (i.e., deviation) between the present section-voltage value and the target-voltage value: Namely, a control using a value which is obtained by multiplying the cumulative sum-total of the deviation by a predetermine Ki in response to a change in the deviation, or, a control using a value which is obtained by multiplying the deviation by a predetermine Kd in response to a change ratio in the deviation. Namely, an operation amount m (t), which is the demand-supply-adjustment request amount, may also be defined as follows:

$$m(t)=Kc \cdot e(t)+Ki \cdot \int e(t)dt+Kd \cdot e(t) \cdot d/dt \quad \text{(Expression 1)}$$

Incidentally, Kc, Ki, and Kd may also be updated based on a learning control.

Here, the operation amount m (t) is equivalent to a power amount which is received or released when a power-reception/power-release capable equipment performs its power-reception or power-release. The operation amount m (t) is defined as the demand-supply-adjustment request amount. The time t is each point-in-time at which the demand-supply-adjustment request is issued.

Incidentally, the constant Kc is a proportion gain, the constant Ki is an integration gain, and the constant Kd is a differentiation gain. These gains may also be updated based on the learning control.

Figure 5:
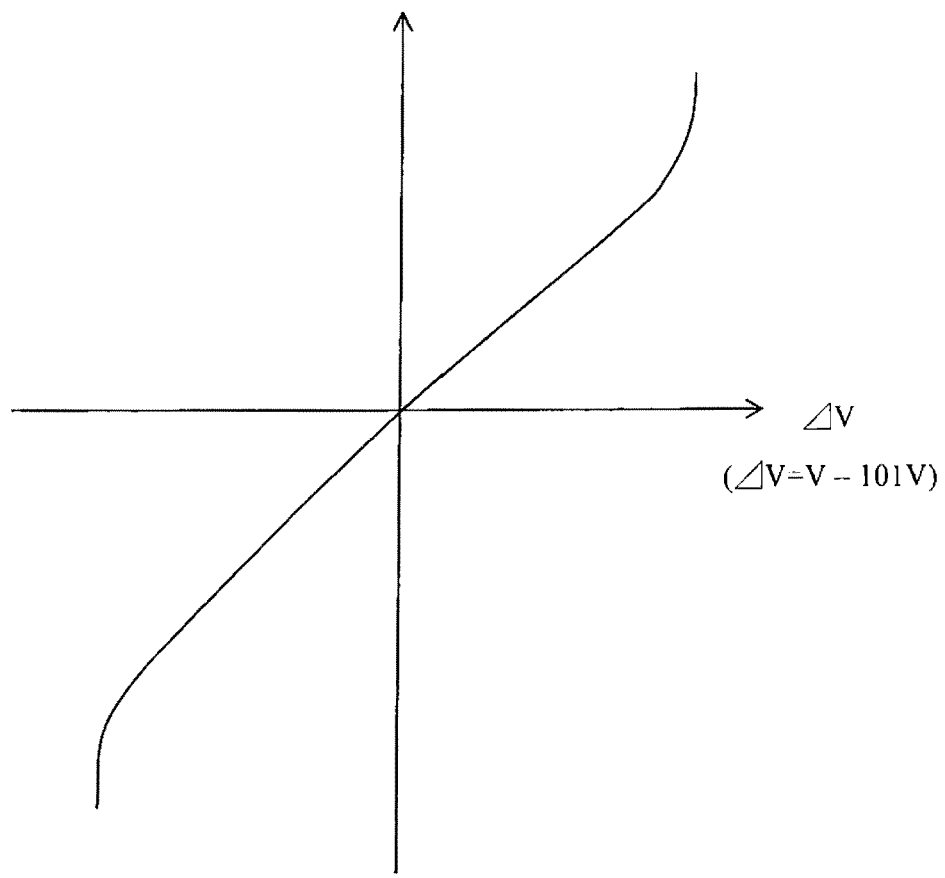
FIG. 5 This is a diagram for illustrating an example of the graph used for the request amount determination in the demand-supply-adjustment-request amount calculation processing 302.

FIG. 5 is a diagram for illustrating an example of the graph 405 which is used for the request amount determination (step 403) of the demand-supply-adjustment power amount in the demand-supply-adjustment-request amount calculation processing 302 illustrated in FIG. 4.

If the present section-voltage value V, which is estimated or calculated by the system-state collection processing 301, is higher than the target-voltage value (which is equal to 101 V in the example in FIG. 5) (i.e., if ΔV is positive), the demand-supply-adjustment request power amount becomes a positive value. As a result, the request becomes a one for requesting the power consumption (including the charge). Consequently, the graph is set such that the power-consumption amount becomes larger as the present section-voltage value becomes higher than the target-voltage value. Meanwhile, if the present section-voltage value V is lower than the target-voltage value (which is equal to 101 V in the example in FIG. 5) (i.e., if ΔV is negative), the demand-supply-adjustment request power amount becomes a negative value. As a result, the request becomes a one for requesting the discharge. Consequently, the graph is set such that the power-discharging amount becomes larger as the present section-voltage value becomes lower than the target-voltage value.

Figure 6:
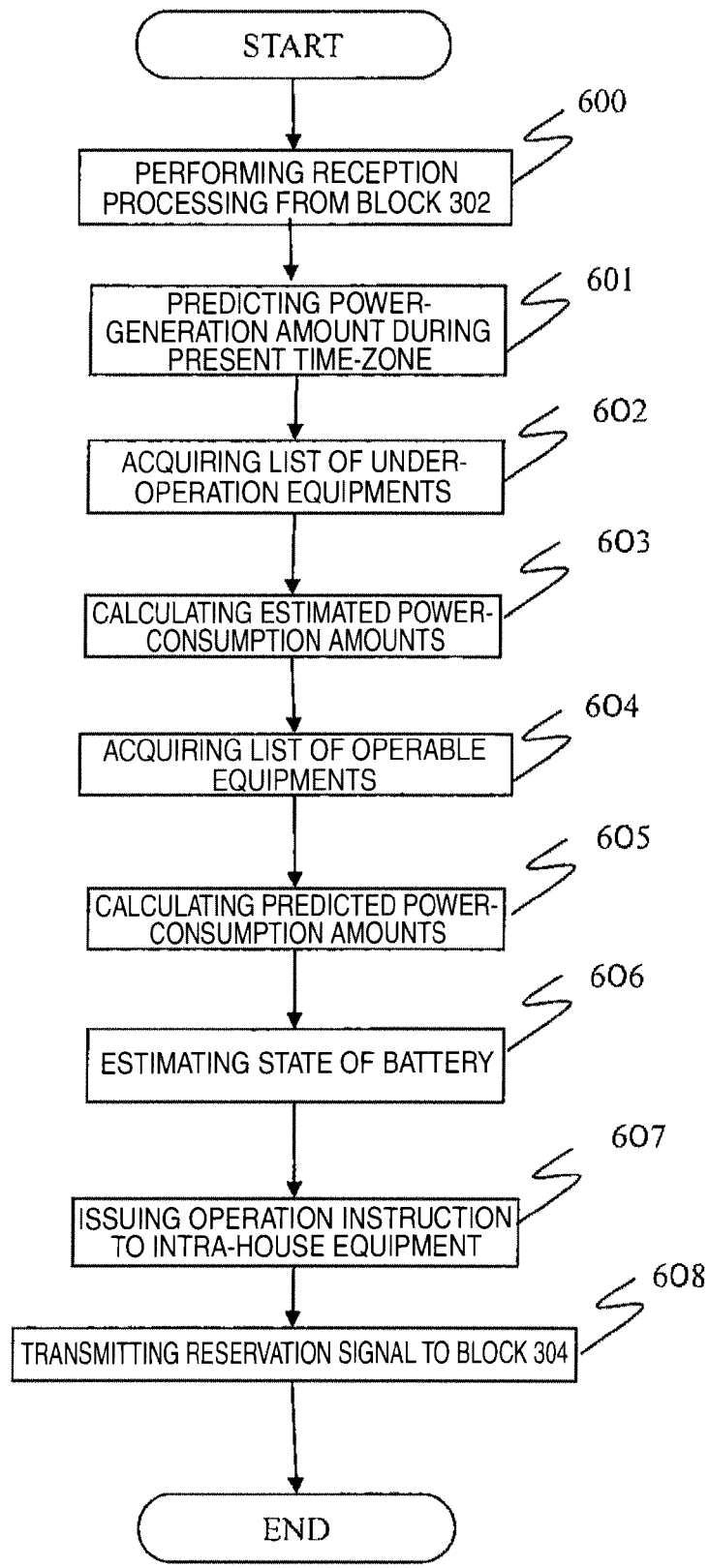
FIG. 6 This is a flowchart for illustrating an example of the operation-reserving processing.

FIG. 6 is a flowchart diagram for illustrating an example of the operation-reserving processings 3031~3039 in the control block diagram illustrated in FIG. 3. Incidentally, this processing is a processing executed by each of the house-equipment controllers 1090~1099.

At a step 600, the house-equipment controller receives the demand-supply-adjustment request notified in the demand-supply-adjustment-request amount calculation processing 302, and the demand-supply-adjustment power amount included in this request.

At a step 601, in accordance with a predetermined time width (i.e., for each time-period), the house-equipment controller performs the prediction of the power amount kWh which will be generated by the distributed power-source device during the present time-zone (i.e., present time-period). Incidentally, in the present embodiment, the prediction is performed such that a single day is divided into predetermined time segments time-periods). For example, in the case of a 0.5-hour width, the prediction may be performed for each of 48-segment time-zones (i.e., time-periods). Incidentally, the prediction may also be performed with respect to the power amount kWh which will be generated by the distributed power-source device 10 minutes, 30 minutes, or 1 hour advance from the present point-in-time.

At a step 602, the house-equipment controller acquires a list of equipments, whose operations are underway at present, from the sensor 50002 via the communications I/F 50001.

At a step 603, the house-equipment controller estimates or calculates the power amounts which will be consumed by these equipments whose operations are underway. The predicted power amounts may also be calculated based on the power-consumption amounts up to the present.

At a step 604, the house-equipment controller acquires a list of equipments, whose operations are not underway at present, but which is operable additionally, from the sensor 50002 via the communications I/F 50001.

At a step 605, the house-equipment controller predicts or calculates the power amount kWh which will be able to be consumed by each of the equipments of the list acquired at the step 604.

With respect to these step 604 and step 605, the more accurate prediction of the operation may be performed by predicting the demand with the use of data about a behavior sensing of residents inside the house. For example, a human-perceiving sensor or a timer is used for the behavior sensing, then memorizing the usage time-zone and usage time-number of the electric equipments. This data is statistically processed, thereby estimating to what extent the demand will occur from now on. A concrete example is as follows: The bathing points-in-time from now on are beforehand estimated from the usage history up to now. Moreover, from the remaining quantity of hot water, the quantity of hot water which will become necessary from now on, and the power amount of the heat-pump water heater necessary for heating water are calculated in advance. In this way, by estimating the behavior pattern of the residents on the basis of the behavior sensing, it becomes possible to predict or calculate the more accurate power-consumption amount.

At a step 606, the house-equipment controller estimates the present charge state of the battery installed into the house, thereby estimating the charge/discharge capable power amount kWh.

At a step 607, the house-equipment controller makes reference to the list of the operable equipments acquired at the step 604, and the information on the battery estimated at the step 606. Then, the house-equipment controller issues an operation instruction to operable equipments or battery in a combination of the operable equipments or battery in which the generated power amount can be consumed up to the largest possible degree. The battery, however, has characteristics that it will deteriorate in accompaniment with its time-elapsed usage. Accordingly, even when the battery can afford to make the demand-supply adjustment, if, from now on, there will be a possibility that another equipment can make the demand-supply adjustment, higher priority may be given to standby of the demand-supply adjustment rather than the discharge from the battery.

At a step 608, if there still remains operable equipment even after the processings up to the step 607 have been terminated, the house-equipment controller transmits, to the acceptance processing 304, plural units of power-reception/power-release capable house equipment, the predicted values of the power-consumption amounts, and the reservation signal of the demand-supply adjustment.

Figure 7:
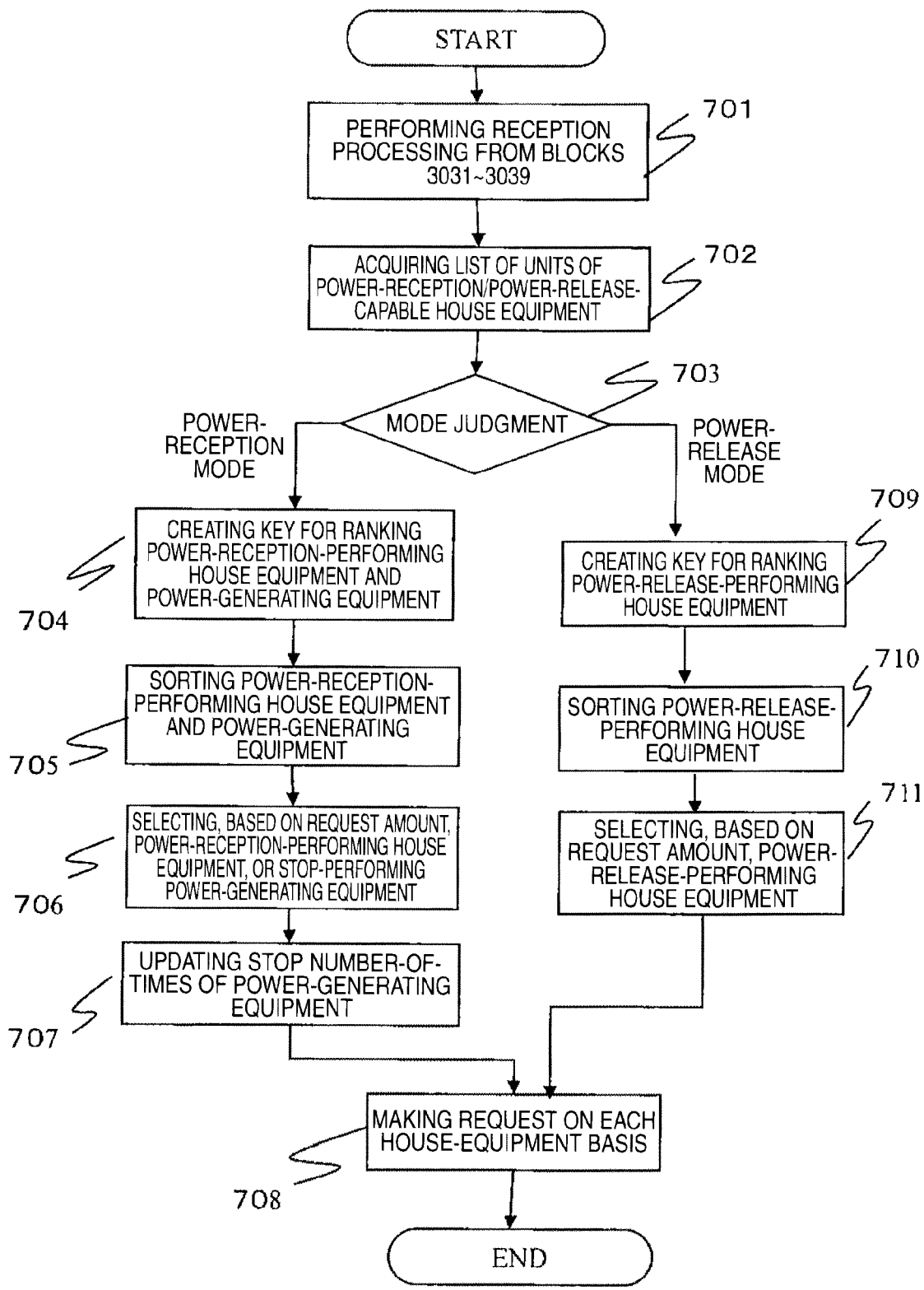
FIG. 7 This is a flowchart for illustrating an example of the acceptance processing.

FIG. 7 is a flowchart diagram for illustrating an example of the acceptance processing 304 in the control block diagram illustrated in FIG. 3. Incidentally, this processing is a processing executed by each of the section controllers 1080~1084.

At a step 701, the section controller receives the plural units of power-reception/power-release capable house equipment, the predicted values of the power-consumption amounts, and the reservation signal of the demand-supply adjustment, which are outputted by the operation-reserving processings 3031~3039.

At a step 702, the section controller creates and acquires a list of all of the received units of power-reception/power-release capable house equipment. The creation of this list may also be performed every time the section controller receives a single unit of equipment.

At a step 703, the section controller judges whether the mode is the power-reception mode or the power-release mode.

If, at the step 703, the section controller has judged that the mode is the power-reception mode, the section controller proceeds to a step 704. At the step 704, the section controller creates a key for ranking the units of power-reception capable house equipment when a unit of house equipment, which should be requested to perform the power-reception, is determined out of the list of the units of power-reception capable house equipment. In the power-reception mode, the stop of the power-generating equipment is not performed whenever possible. Moreover, a key may be set which ranks the house equipment so that the highest priority is given to an increase in the power-consumption amount by the power-reception into the house equipment. Furthermore, a key may be created and added which ranks the house equipment so that the requests are not concentrated onto a particular house.

At a step 705, based on the key created at the step 704, the section controller sorts the units of power-reception capable house equipment within the list.

At a step 706, based on the demand-supply-adjustment request amount calculated in the demand-supply-adjustment-request amount calculation processing 302, the section controller selects, out of the list, the unit of house equipment which should perform the power-reception. At this time, if the request amount is not exceeded by the power-reception alone, the stop of the power-generating equipment is performed. The selection of the power-generating equipment which should be stopped is made by making reference to the past stop number-of-times of the power-generating equipment. For example, a ranking key may be created so that the highest priority of the power-reception is given to a house whose power-generating equipment's stop number-of-times is the largest.

At a step 707, the section controller performs update of the stop number-of-times of the power-generating equipment selected.

At a step 708, the section controller makes an operation request to each house equipment selected.

Meanwhile, if, at the step 703, the section controller has judged that the mode is the power-release mode, the section controller proceeds to a step 709. At the step 709, the section controller creates a key for ranking the units of power-release capable house equipment when a unit of house equipment, which should be requested to perform the power-release, is determined with respect to the list of the units of power-release capable house equipment. At this time, a key may be created which ranks the house equipment so that the requests are not concentrated onto a particular house.

At a step 710, based on the key created at the step 709, the section controller sorts the units of power-release capable house equipment within the list.

At a step 711 based on the demand-supply-adjustment request amount calculated in the demand-supply-adjustment-request amount calculation processsing 302, the section controller selects, out of the list, the unit of house equipment which should perform the power-release. At the step 708, the section controller makes the operation request to each house equipment selected at the step 711.

In this way, the demand-supply-adjustment request amount calculated by the section controller is assigned to a plurality of equipments in a plurality of facilities by an amount which the plurality of equipments find it possible to address. This assignment makes it possible to stabilize the voltage within the reference range.

Figure 8:
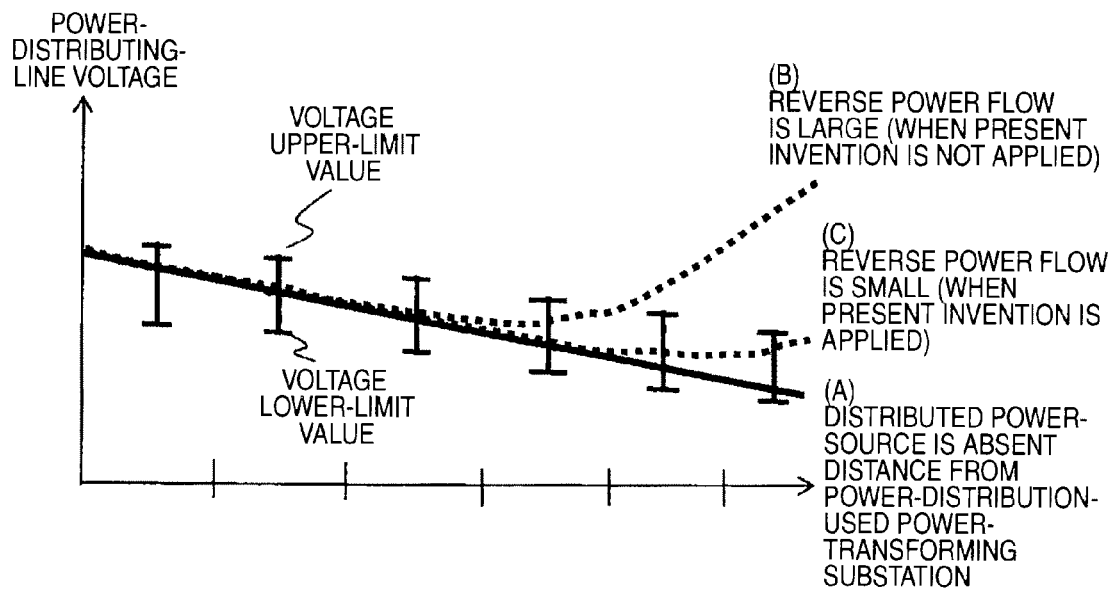
FIG. 8 This is a diagram for exemplifying the relationship between the distance from a power-distribution-used power-transforming substation and the power-distributing-line voltage.

Referring to FIG. 8, the explanation will be given below regarding an effect of the present embodiment.

Usually, as illustrated in a notation (A) in FIG. 8, the voltage in the high-voltage power-distributing line becomes gradually lowered as the power-distributing line goes away from the power-distribution-used power-transforming substation. Taking this voltage change into consideration as the precondition, the on-pillar transformer is so set as to supply the power to the low-voltage power-distributing line in such a manner that the high-voltage is transformed into the low-voltage (e.g., (101±6) V) (the high-voltage is illustrated as its voltage upper-limit value and its voltage lower-limit value on each section basis, and is expected for each its installation location) (the transformation ratio is fixed by positioning a transformation coil's winding ratio adjuster which is referred to as "tap"). As illustrated in a notation (B) in FIG. 8, however, if the distributed power-source is connected to the power-distributing line, and thus if there occurs the phenomenon of a reverse power flow that the effective ineffective power flows into the power-distributing line, the voltage in the high-voltage power-distributing line becomes higher than its reference value. On account of this phenomenon, the voltage in the low-voltage power-distributing line also becomes higher than its reference value, thereby deviating from the proper range (e.g., (101±6) V). Meanwhile, a notation (C) in FIG. 8 illustrates the voltage in the high-voltage power-distributing line in the case where the processings in the electric-power management system of the present embodiment are executed. Even if the distributed power-source is connected to the power-distributing line, and even if the effective/ineffective power flows therein, the group-mannered collective operation of the units of house equipment is executed before the voltage becomes higher than the reference value. The execution of this group-mannered collective operation makes it possible to suppress the excessive reverse power flow from flowing into the power distribution system, thereby allowing execution of the operation within the proper voltage range which becomes lower than the reference value.

Figure 9:
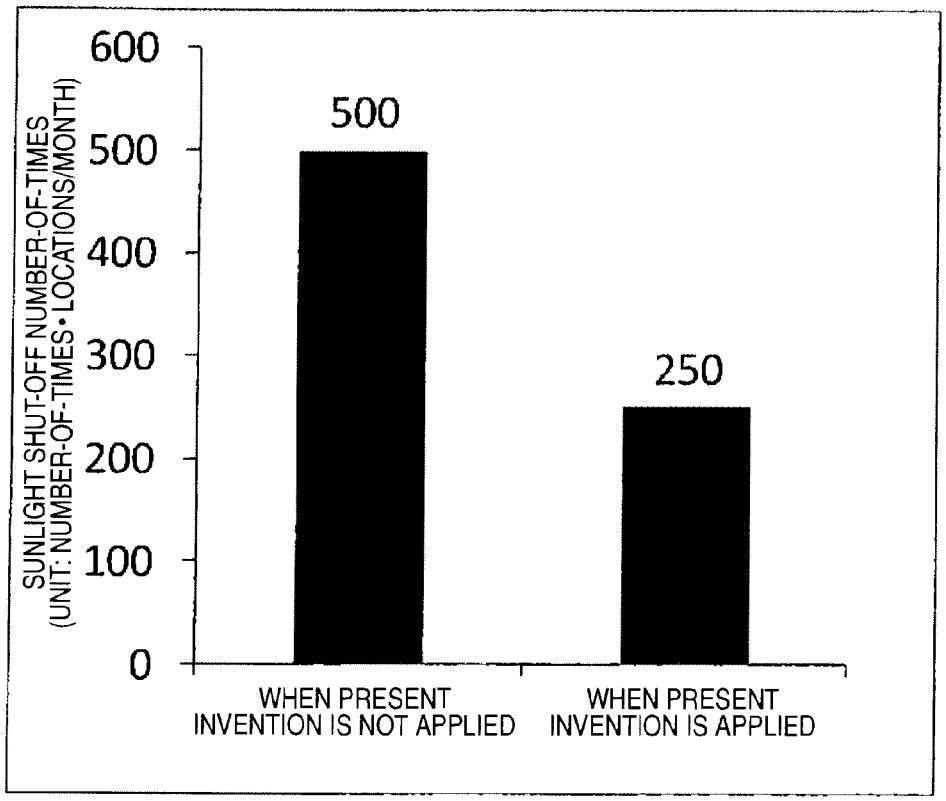
FIG. 9 This is a diagram for exemplifying the sunlight shut-off number-of-times.

Referring to FIG. 9, the explanation be given below regarding another effect of the present embodiment.

This effect is about the suppression of the photovoltaic output in the case where the electric-power management system of the present embodiment is introduced. As illustrated in (B) in FIG. 8, if there occurs the voltage rise that is higher than the reference value, a countermeasure is usually taken where the power generation by the distributed power-source such as the photovoltaic power generator is shut off. When the photovoltaic power generators are introduced by a certain quantity (e.g., 600-house locations in a power-distributing line for supplying the power to 1200 houses in total), the prevention of the reverse power flow, which becomes the cause for the voltage rise, requires execution of, e.g., 500-[number-of-time•location] shut-offs per month. Nevertheless, the application of the electric-power management system of the present embodiment makes it possible to reduce this shut-off number-of-times. An example illustrated in FIG. 9 shows that the shut-off number-of-times are reduced down to the one-half, i.e., 250 [number-of-times•locations] per month.

As having been explained so far, according to the resent embodiment, it becomes possible to rationally utilize the power-reception capable equipments and the power-release capable equipments within facilities, and to stabilize the power distribution system's voltage within a certain constant range without imposing an excessive load onto the equipment equipments within a particular facility.

Embodiment 2

Next the explanation will be given below concerning a second embodiment of the present invention.

In the present embodiment, the processings illustrated in FIG. 3 are modified in the system configuration illustrated in FIG. 1 and FIG. 2 in the first embodiment. More concretely, the present embodiment is the following embodiment: Namely, an accident (such as a ground fault) has occurred in a high-voltage power-distributing line. If an accident (such as a ground fault) has occurred in a high-voltage power-distributing line, a section which includes the accident point therein is cut of from the power distribution system. As a result, the cut-off section falls into a state (i.e. a single operation) where only the distributed power-sources supply the power to the customers. Accordingly, the power-distributing-line's voltage becomes unstable. Consequently, maintaining the power-distributing-line voltage within a certain constant range requires that these abnormalities be detected and eliminated.

The explanation will be given below selecting, as an example, a case where an accident (such as a ground fault) has occurred in the high-voltage power-distributing line 102 illustrated in FIG. 1.

In substitution for the processing at the step 301 (refer to FIG. 3) executed by the area controller 107 in the first embodiment, the area controller 107, which is equipped with a distribution-automation (: DA) system function, identifies the two opened openers/closers (e.g., 1033 and 1034) which are deployed at the positions sandwiching the accident point (e.g., the ground-fault point) therebetween. At the step 301, with respect to all of the section controllers existing within the section which includes the accident point therein, the area controller 107 sets 0 V as the target-voltage value in the section.

In substitution for the processing at the step 302 carried out by each of the section controllers 1080~1084 in the first embodiment described earlier, referring to FIG. 11, the explanation will be given below regarding processings which will be carried out by each of the section controllers in the present embodiment.

At the step 401, each section controller receives, from the area controller the voltage value in the present corresponding section, and the target-voltage value.

At a step 1101, each section controller confirms whether or not the target-voltage value received from the area controller is equal to 0 V.

If each section controller has confirmed that the target-voltage value received is equal to 0 V, there exists a danger of the single operation of the power-sources such as the distributed power-sources existing within the section. Accordingly, each section controller existing within the section proceeds to a step 1102, where each section controller judges whether or not there exists a power-source which is performing the single operation at present. Namely, each section controller inquires of each house-equipment controller subordinate thereto about the output amounts of the PCSs which are attached to the distributed power-source device 201, the battery 202, and the EV 203. Moreover, if there exists a power-source whose output amount is larger than 0, each section controller judges that there exists the power-source which is performing the single operation at present (step 1102: Yes). Otherwise, each section controller acquires values of the voltage and current of the power sensor under the on-pillar transformer. Moreover, based on the values of the voltage and current, each section controller may judge the presence or absence of the power-source which is performing the single operation (step 1102).

If each section controller has judged that there exists the power-source which is performing the single operation, at the step 302, each section controller calculates the output of each equipment at 0. Furthermore, each section controller issues an instruction to the house-equipment controller of a house which includes the single-operation-performing equipment. This instruction is issued in order to parallel off, from the power distribution system, the distributed power-source device 201, the battery 202, or the EV 203 which is performing the single operation (step 1103).

When the instruction at the step 1103 is issued to the house-equipment controller the house-equipment controller executes the stop of the PCS by executing the step 305 which is explained in FIG. 3 in the first embodiment described earlier. At this time the processings at the steps 3031~3039 and the step 304 in FIG. 3 in the first embodiment are not executed. After the PCS-stop processing has been terminated, the house-equipment controller issues a notice to the effect to each section controller. Furthermore, after the PCS-stop processings for all of the PCSs which have been performing the single operation have been terminated, each section controller issues a notice to the effect to the area controller.

Having acquired the recovery information on the accident in the high-voltage power-distributing line 102, the area controller 107, which is equipped with the distribution-automation (: DA) system function, restarts the processings illustrated in FIG. 3. At this time, with respect to all of the section controllers existing within the section which has been recovered from the accident, the area controller 107 issues an instruction of setting 101 V or the range of (101±6) V as the target-voltage value in the section. When each section controller receives the instruction of setting the target-voltage value at 101 V or (101±6) V from the area controller 107 after the PCS-stop processings for all of the PCSs have been terminated, each section controller instructs the house-equipment controller to restart the operation of the distributed power-source device 201, the battery 202, or the EV 203 which has been recovered from the accident.

The above-described configuration allows the area controller to detect the occurrence of an accident in a high-voltage power-distributing line at the time of this accident occurrence, thereby making it possible to detect the single operation of a power-source. Also, the above-described configuration allows the area controller to coordinate with the house-equipment controller, thereby making it possible to prevent the single operation of a power-source without fail. Also, the above-described configuration allows the area controller and each section controller to coordinate with each other, thereby allows again parallel operation of the power-source and the system automatically.

According to the present embodiment, even if an accident has occurred on the high-voltage power-distributing line, it becomes possible to prevent the ripple of this accident and the single operation of a power-source. This feature allows the control to be executed such that no influence is exerted onto the power-distributing-line's voltage.

Embodiment 3

Next, the explanation will be given below concerning a third embodiment of the present invention.

In the present embodiment, the processings illustrated in FIG. 3 are modified in the system configuration illustrated in FIG. 1 and FIG. 2 in the first embodiment. More concretely, the present embodiment is the following embodiment: Namely, an accident such as a ground fault has occurred in a low-voltage power-distributing line.

If an accident has occurred in a low-voltage power-distributing line, the area controller alone finds it impossible to detect the accident. If an accident has occurred in a low-voltage power-distributing line, there occurs the single operation where only the distributed power-sources supply the power to the customers. Accordingly, there exists a danger that the power-distributing-line's voltage will become unstable. Consequently, maintaining the power-distributing-line's voltage within a certain constant range requires that these abnormalities be detected and eliminated.

The explanation will be given below selecting, as an example, a case where an accident (such as a ground fault) has occurred in a low-voltage power-distributing line (e.g., 105) based on and illustrated in FIG. 1.

Figure 12:
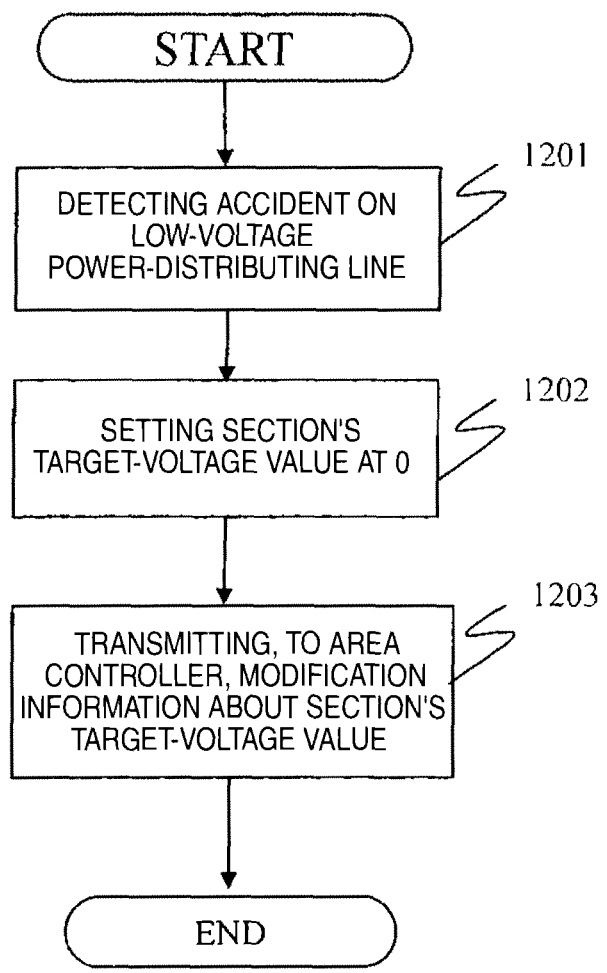
FIG. 12 This is a diagram for illustrating an example of the processing in the section controller which has detected an accident of a low-voltage power-distributing line.

In the present embodiment, it is assumed that each section controller is equipped with a function of spontaneously setting the target-voltage value in the section at the time of the occurrence of an accident in the low-voltage power-distributing line. In the present embodiment, in substitution for the step 301 in FIG. 3 which is executed by the area controller in the first embodiment, each section controller carries out the following processings illustrated in FIG. 12.

First, the section controller 1081 attached onto the switch or the on-pillar transformer detects an accident in the low-voltage power-distributing line by detecting, e.g., a ground-fault current from the current value obtained by the power sensor 60001 (step 1201). At this time, the section controller 1081 notifies the area controller 107 about the accident occurrence and the accident-occurrence section.

Next, the section controller immediately sets the target-voltage value in its section at 0 V without waiting for the instruction from the area controller (step 1202).

The section controller transmits, to the area controller, modification information about the target-voltage value in the section (step 1203). Incidentally, after the area controller has received this modification information, the area controller executes the control in such a manner that the target-voltage value for the section controller is maintained at 0 V until a recovery notice is issued thereto.

Figure 11:
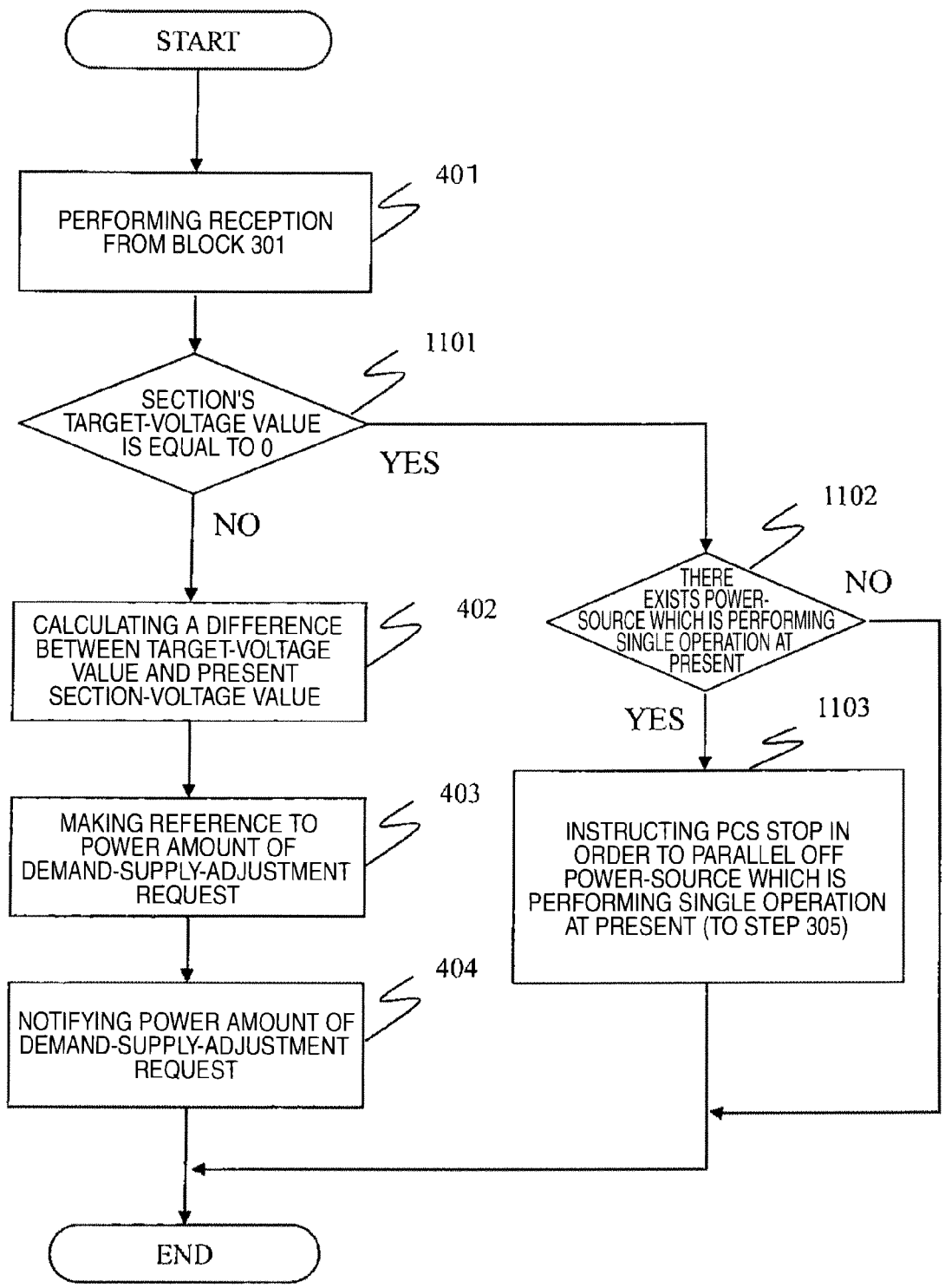
FIG. 11 This is a flowchart for illustrating another example of the demand-supply-adjustment-request amount calculation processing.

As a processing to be substituted for the step 302 illustrated in FIG. 3 in the first embodiment, as is the case with the second embodiment, the section controller carries out the processing illustrated in FIG. 11.

At the step 1202 described earlier, the section controller sets the target-voltage value at 0 V (step 1101: Yes). Accordingly, the section controller proceeds to the step 1102. At the step 1102, the section controller inquires of each house-equipment controller 1090~1094 about the output amounts of the PCSs which are attached to the distributed power-source device 201, the battery 202, and the EV 203. Moreover, the section controller judges whether or not the output amounts are larger than 0, thereby judging whether or not a power-source is performing the single operation at present. If the section controller has judged that the power-source is performing the single operation, the section controller instructs each house-equipment controller to stop the PCS in order to disconnect, from the power distribution system, the distributed power-source device 201 the battery 202, or the EV 203 which is performing the single operation (step 1103).

In this case, the processings at the steps 3031~3039 and the step 304 in FIG. 3 are not executed. Instead, at the step 305 in FIG. 3, each house-equipment controller executes the processing for the above-described PCS-stop instruction. After the PCS-stop processing has been terminated, each house-equipment controller issues a notice to the effect to the section controller. Furthermore, after the PCS-stop processings for all of the PCSs which have been performing the single operation have been terminated, the section controller issues a notice to the effect to the area controller.

The section controller 1081 receives an input of the recovery information from a maintenance personnel via a communications I/F connected with an information terminal possessed by the maintenance personnel. In this way, the section controller 1081 detects that the accident in the low-voltage power-distributing line is recovered. Otherwise, the section controller 1081 may detect the accident's recovery by causing the intra-house distributed power-source to turn on the ineffective power via each house-equipment controller. When the section controller 1081 detects the recovery, the section controller issues a notice to the effect to the area controller 107.

Having received this recovery notice, the area controller restarts the processings illustrated in FIG. 3. At this time, with respect to each section controller existing within the section, the area controller sets 101 V or the range of (101±6) V as the target-voltage value in the section at the step 301. When each section controller receives 101 V or the range of (101±6) V as the target-voltage value after the stop processing for the single operation, each section controller instructs the house-equipment controller to restart the operation of the distributed power-source whose single operation is stopped.

The above-described configuration allows a section controller to detect the occurrence of an accident in a low-voltage power-distributing line at the time of this accident occurrence. Moreover, the above-described configuration allows the section controller to coordinate with the house-equipment controller, thereby making it possible to detect the single operation of a power-source. This feature makes it possible to prevent the single operation of the power-source without fail. Also, the above-described configuration allows the section controller to restart parallel operation of the power-source and the system automatically.

According to the present embodiment, even if an accident has occurred on the low-voltage power-distributing line, it becomes possible to prevent the ripple of this accident and the single operation. This feature allows the control to be executed such that no influence is exerted onto the power-distributing-line's voltage.

Embodiment 4

Next, the explanation will be given below concerning a fourth embodiment of the present invention.

In the present embodiment, the processings illustrated in FIG. 3 are modified in the system configuration illustrated in FIG. 1 and FIG. 2 in the first embodiment. More concretely, the present embodiment is the following embodiment: Namely, the PCS, which is equipped with the single-operation prevention function, is caused into its malfunction due to instantaneous voltage lowering•system disturbance. If there occur the instantaneous voltage lowering•system disturbance, the single-operation-prevention-function-equipped PCS is caused to stop by its malfunction. As a result, there exists a danger that the distributed power-sources and the like are disconnected from the power distribution system in unison, and that the power-distributing-line's voltage will become rapidly lowered. Consequently, maintaining the power-distributing-line's voltage within a certain constant range requires that these not-accident instantaneous voltage lowering•system disturbance be detected and eliminated.

Figure 13:
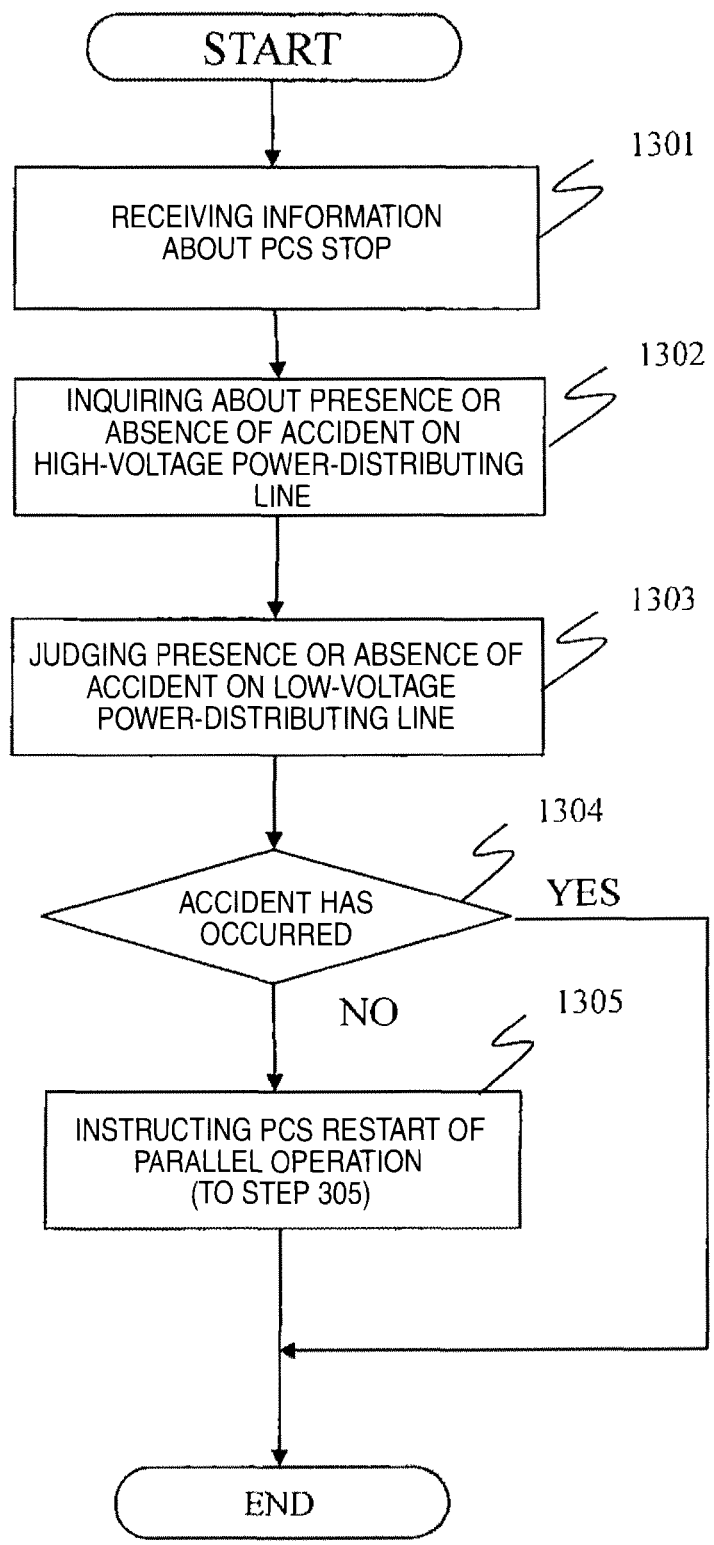
FIG. 13 This is a diagram for illustrating an example of the processing in the section controller which has detected the PCS stop.

The explanation will be given below selecting, as an example, a case where any one of the PCSs included in the house equipment 1100 stops. In substitution for the step 302 (refer to FIG. 3) in the first embodiment described earlier, each section controller carries out the processings illustrated in FIG. 13.

Here, the section controller 1081 is attached onto the switch within a section including the house equipment which includes the PCS that has stopped, or is attached onto the on-pillar transformer which extracts the low-voltage power-distributing line into the house equipment. The section controller 1081 immediately receives, from the house-equipment controller 1090, a notice to the effect that the PCS has stopped (step 1301).

The section controller immediately inquires of the area controller 107 about the presence or absence of the occurrence of an accident in the high-voltage power-distributing line 102 (step 1302).

Moreover, the section controller judges the presence or absence of the occurrence of an accident in the low-voltage power-distributing line 105 (step 1303).

If, at a step 1304, the section controller judges that no accident has occurred not only in the high-voltage power-distributing line but also in the low-voltage power-distributing line, the section controller estimates and judges that the instantaneous voltage lowering•system disturbance has occurred. Accordingly, in order to prevent the in-unison disconnection, the section controller issues, to the house-equipment controller or the PCS, an instruction of performing the restart of parallel operation immediately (step 1305). In this case, the processings at the steps 3031~3039 and the step 304 in FIG. 3 are not executed. Instead, the house-equipment controller executes the processing at the step 305.

After the restart of parallel operation processing has been terminated, the section controller notifies the area controller about the termination of the restart of parallel operation processing.

Even if the PCS is disconnected by its malfunction at the time of the instantaneous voltage lowering•system disturbance, the above-described configuration allows the section controller to further coordinate with the house-equipment controller, thereby making it possible to detect the disconnection. This feature makes it possible to prevent without fail the in-unison disconnection of the distributed power-sources and the like within the section.

According to the present embodiment, even at the time of the instantaneous voltage lowering•system disturbance, it becomes possible to prevent the in-unison disconnection of the distributed power-sources and the like. This feature allows the control to be executed such that no influence is exerted onto the power-distributing-line's voltage.

In the first to the fourth embodiments, at the nor al time, the target-voltage value has been set at 101 V (i.e. normal reference value) or (101±6) V. Meanwhile, at the accident-occurrence time, the target-voltage value has been set at 0 V (i.e., accident-time reference value). The present invention, however, is not limited to these embodiments. For example, the target-voltage value at the normal time may also be set at a reference value which is determined in advance in its supply area (e.g., (110±10) V, (120±10) V, 110 V, 115 V, 120 V, 127 V, 220 V, 230 V, or 240 V).

Also, the plural units of house equipment may also perform direct communications with the section controller. This configuration is effective when it carried out in a mode where only a small number of units of house equipment exist inside the house, and where the function of the house-equipment controller is directly installed into the house equipment.

Also, the area controller 107 in the first to the fourth embodiments may also acquire the state information about each switch of the high-voltage power-distributing line 102 from an external server which is equipped with the distribution-automation (: DA) function. Otherwise, the area controller 107 may also acquire the state information about each switch of the high-voltage power-distributing line 102 in such a manner that the distribution-automation (: DA) function is provided to the area controller as one of the functions with which the area controller is equipped. Also, each switch of the high-voltage power-distributing line 102, in particular, may also be equipped with a recloser. In this case, with respect to the ground-fault accident or a short-circuit accident, each recloser-equipped switch judges in-advance-set accident-detecting conditions (i.e., ground-fault interruption current, voltage, and time, and short-circuit interruption current, voltage, and time), thereby automatically opening (i.e., accident-interrupting) the high-voltage power-distributing line. Moreover, after the accident-interruption, the reclose function of the recloser re-turns on the power into each switch after a lapse of an in-advance-set time-interval (i.e., reclose time-interval). It is needless to say that the distribution-automation (: DA) includes a function of monitoring the information about the opening and re-turning-on of each switch like this. Also, the area controller 107 may also acquire the information about the sent-out powers (i.e., current, voltage, ineffective power, and effective power) from the power-transforming substation to the high-voltage power-distributing line 102 from the distribution-automation-(: DA)-function-equipped external server. Otherwise, the area controller 107 may also acquire the information about the sent-out powers to the high-voltage power-distributing line 102 in such a manner that the distribution-automation (: DA) function is provided to the area controller as one of the functions with which the area controller is equipped.

Also, the section controller in the first to the fourth embodiments is attached onto the on-pillar transformer. At this time, it is needless to say that the section controller finds it possible to acquire the intra-section power information about the low-voltage power-distributing line 105, which is branched from the high-voltage power-distributing line 102 via the on-pillar transformer, from the measurement values (such as, e.g., voltage, current, effective power, and ineffective power) obtained by the power sensor mounted onto the on-pillar transformer. This acquisition is made possible including the case where the section controller possesses the information about the load-side house-equipment controller and house equipment which receive the power supply from the on-pillar transformer.

Also, in the case of constructing the electric-power management system in the first to the fourth embodiments, when the electric-power system illustrated in FIG. 1 has been already implemented, the area controller is set up first. Subsequently, the section controller may be set up when there occurs a section which additionally installs equipments such as the distributed power-source and battery that perform the power-release to the low-voltage power-distributing line, and which includes the on-pillar transformer that is connected to the low-voltage power-distributing line. This set-up method makes it possible to eliminate a section in which the power-release prevents the low-voltage-power-distributing-line's voltage from becoming equal to the reference value (e.g., (101±6) V) at the normal time, and 0 V at the accident-occurrence time. Also, with respect to a section in which there occurs none of the power-release performed by the distributed power-source and battery, the power supply at the electric-property-based natural voltage can be performed. So far, the explanation has been given concerning the following fact: Namely, these voltage maintenances can be accomplished via the construction process that the section controllers are set up only at the necessary locations in an economical and stepwise manner.

The invention claimed is:

1. An electric-power management system, comprising:
each of facility-equipment controllers installed into facilities on each facility basis, and managing a single equipment or a plurality of equipments in each of said facilities;
each of section controllers for controlling each of said facility-equipment controllers; and
an area controller for controlling each of said section controllers, wherein
said area controller comprises a communications unit for transmitting information to each of said section controllers, said information indicating a target value about electric power and a current-state value about said electric power,
each of said section controllers, comprising:
a reception unit for receiving power-reception/power-release capable equipment information from each of said facility-equipment controllers as information about a power amount whose power-reception/power-release is capable of being performed by a facility into which said facility-equipment controller is installed;
a demand-supply-adjustment-request amount calculation unit for calculating a difference value between said target value and said current-state value, and, based on said difference value, calculating a demand-supply-adjustment request amount for said electric power; and
a transmission unit for transmitting, based on said power-reception/power-release capable equipment information, said demand-supply-adjustment request amount to said facility-equipment controller, said power-reception/power-release capable equipment information having been transmitted from said facility-equipment controller, said power-reception/power-release of said demand-supply-adjustment request amount being capable of being performed in said facility into which said facility-equipment controller is provided,
said facility-equipment controller, based on said demand-supply-adjustment request amount, transmitting a control signal to said single equipment or said plurality of equipments, said demand-supply-adjustment request amount being received from said section controller.

2. An electric-power management system, comprising:
each of section controllers for controlling electric power in a plurality of facilities;
an area controller for controlling each of said section controllers; and
each of facility-equipment controllers installed into said facilities on each facility basis, and managing a single equipment or a plurality of equipments in each of said facilities, wherein
said area controller transmits information to each of said section controllers, said information indicating a target value about said electric power and a current-state value about said electric power,
each of said section controllers calculating a difference value between said target value and said current-state value, and, based on said difference value, calculating a demand-supply-adjustment request amount for said electric power,
each of said facility-equipment controllers transmitting power-reception/power-release capable equipment information to each section controller, said power-reception/power-release capable equipment information being information about power-reception/power-release capable equipments in a facility into which said facility-equipment controller is installed, said section controller, based on said power-reception/power-release capable equipment information, transmitting said demand-supply-adjustment request amount for said power-reception/power-release capable equipments to said facility-equipment controller in said facility into which said power-reception/power-release capable equipments are installed, and said facility-equipment controller, based on said demand-supply-adjustment request amount for said equipments, transmitting a control signal to said single equipment or said plurality of equipments, said demand-supply-adjustment request amount being received by said facility-equipment controller from said section controller.

3. The electric-power management system according to claim 1, wherein said current-state value is a current-state voltage value, said target value being a target voltage value, said section controller transmitting a power-consumption amount to said facility-equipment controller as said demand-supply-adjustment request amount, if said current-state voltage value is higher than said target voltage value, said section controller transmitting a power-release amount to said facility-equipment controller as said demand-supply-adjustment request amount, if said current-state voltage value is lower than said target voltage value.

4. The electric-power management system according to claim 1, wherein said power-reception/power-release capable equipment information includes said information indicating said power-reception/power-release capable equipments, and information indicating a power-consumption amount or a power-release amount whose power-reception/power-release is capable of being performed by said equipments.

5. The electric-power management system according to claim 1, wherein said section controller, based on said power-reception/power-release capable equipment information, calculating an operation order of said equipments, said section controller then, based on said operation order, transmitting said demand-supply-adjustment request amount for said equipments to said facility-equipment controller.

6. The electric-power management system according to claim 5, wherein said operation order of said equipments is determined in a manner of being distributed into said plurality of facilities.

7. The electric-power management system according to claim 1, wherein said current-state value is a current-state voltage value, said target value being a target voltage value.

8. The electric-power management system according to claim 1, wherein said section controller calculates said demand-supply-adjustment request amount, said section controller then dividing and allocating said demand-supply-adjustment request amount for said equipments to said power-reception/power-release capable equipments.

9. The electric-power management system according to claim 1, wherein said current-state value is a current-state voltage value, said target value being a target voltage value, said area controller setting said target voltage value of said section controller and that of another section controller at lower values, if value of information about said electric power of said section controller falls above a predetermined reference value, said area controller setting said target voltage value of said section controller and that of another section controller at higher values, if said value of said information about said electric power of said section controller falls below said predetermined reference value.

10. An electric-power management method in an electric-power management system, said electric-power management system, comprising:

each of section controllers for controlling electric power in a plurality of facilities;

an area controller for controlling each of said section controllers; and each of facility-equipment controllers installed into said facilities on each facility basis, and managing a single equipment or a plurality of equipments in each of said facilities, said electric-power management method, comprising the steps of:

said area controller's transmitting a target value about said electric power to each of said section controllers;

each of said section controllers' calculating a difference value between a current-state value about said electric power and said target value received from said area controller, and, based on said difference value, calculating a demand-supply-adjustment request amount for said electric power;

each of said facility-equipment controllers' transmitting power-reception/power-release capable equipment information to each section controller, said power-reception/power-release capable equipment information being information about power-reception/power-release capable equipments in a facility into which said facility-equipment controller is installed;

said section controller's, based on said power-reception/power-release capable equipment information about said equipments, transmitting said demand-supply-adjustment request amount for said equipments to said facility-equipment controller in said facility into which said equipments are installed; and said facility-equipment controller's, based on said demand-supply-adjustment request amount, transmitting a control signal to said single equipment or said plurality of equipments, said demand-supply-adjustment request amount being received by said facility-equipment controller from said section controller.

11. The electric-power management method according to claim 10, wherein said current-state value is a current-state voltage value, said target value being a target voltage value, said electric-power management method, further comprising the steps of:

said section controller's transmitting a power-consumption amount to said facility-equipment controller, if said current-state voltage value is higher than said target voltage value, said power-consumption amount being said demand-supply-adjustment request amount; and said section controller's transmitting a power-release amount to said facility-equipment controller, if said current-state voltage value is lower than said target voltage value, said power-release amount being said demand-supply-adjustment request amount.

12. The electric-power management method according to claim 10, wherein
said power-reception/power-release capable equipment information includes said information about said power-reception/power-release capable equipments, and information about a power-consumption amount or a power-release amount whose power-reception/power-release is capable of being performed by said equipments.

13. The electric-power management method according to claim 10, further comprising a step of:
an acceptance-processing transmission unit of said section controller's, based on said power-reception/power-release capable equipment information, calculating an operation order of said equipments, and, based on said operation order, transmitting operation requests for operating said equipments to said facility-equipment controller.

14. The electric-power management method according to claim 12, wherein
said operation order of said equipments is determined in a manner of being distributed into said plurality of facilities.

15. The electric-power management method according claim 10, wherein
said section controller calculates said demand-supply-adjustment request amount, said section controller then dividing and allocating said demand-supply-adjustment request amount for said equipments to said power-reception/power-release capable equipments.

16. A section controller for controlling electric power in a plurality of facilities,
said section controller, comprising:
a demand-supply-adjustment-request amount calculation unit for calculating a difference value between a current-state value about said electric power and a target value about said electric power, and, based on said difference value, calculating a demand-supply-adjustment request amount for said electric power, said target value being received from an area controller for controlling said section controller; and
an acceptance-processing transmission unit for receiving power-reception/power-release capable equipment information from each of facility-equipment controllers, said power-reception/power-release capable equipment information being information about power-reception/power-release capable equipments in a facility into which said facility-equipment controller is installed, and, based on said power-reception/power-release capable equipment information, transmitting, to said facility-equipment controller, said demand-supply-adjustment request amount set for said equipments of said facility equipment.

17. The electric-power management system according to claim 1, wherein
each of said facility-equipment controllers is integrated into said single equipment or said plurality of equipments.

* * * * *